Figure 1:
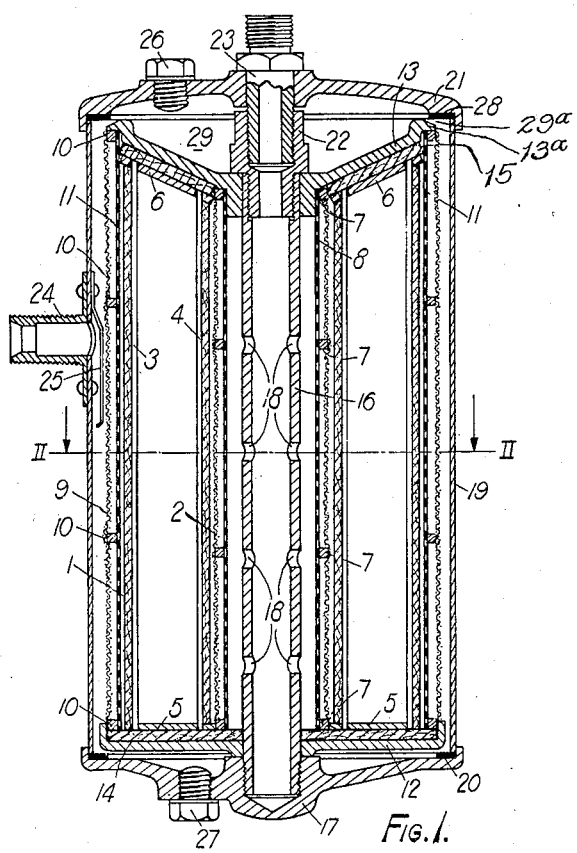

Nov. 28, 1933.  A. A. SIDNEY  1,937,415

FILTER

Filed May 6, 1933

INVENTOR
Arthur A. Sidney
By
ATTORNEY

Patented Nov. 28, 1933

1,937,415

UNITED STATES PATENT OFFICE 1,937,415

FILTER

Arthur Alexander Sidney, Thornton Heath, England

Application May 6, 1933, Serial No. 669,779, and in Great Britain March 31, 1932

1 Claim. (Cl. 210—165)

The invention relates to a method of filtering fluids, more particularly liquid fuels such as are used in internal combustion engines.

In filtering liquid fuel for internal combustion engines, it is desirable for the fuel to attain a very high degree of filtration before passing to the fuel pump or other means by which it is delivered to the engine. It is also very desirable, especially where a pump is employed to deliver the fuel to the engine such for example as in the case of Diesel engines, to prevent as far as possible any air or other gaseous matter contained within the fuel from entering the fuel pump, and thus upsetting the correct metering thereof.

In order to obtain a high degree of filtration of liquids such as liquid fuel for internal combustion engines, it is usual to pass the liquid through a filtering element of felt, fabric, leather or similar material. On leaving such a filtering element, however, the filtered fuel frequently carries away with it minute portions of the exterior surface of the filter element which from time to time becomes disintegrated therefrom.

The invention has for its object to provide a filtering device of the type utilizing one or more filtering elements of felt, fabric, leather or the like, in which substantially all of the disintegrated particles of the felt or other material carried away with the filtered fluid are prevented from passing out of the filtering device and thus a high degree of filtration is obtained.

According to a further and independent feature of the invention, a filtering device intended for filtering liquids such as liquid fuels for internal combusion engines, is so constructed as to prevent, as far as possible, air or other gaseous matter contained in the liquid from passing out of the device.

In the improved filtering device according to the present invention, the fluid to be filtered, after passing through a filtering element of felt, fabric, leather or like material, is caused to be passed through a second filtering element of substantially fine mesh metal gauze, whereby the disintegrated particles of the first filter element are prevented from passing out of the filtering device.

For the purpose of preventing air or other gaseous matter in a liquid which is to be filtered from passing out of the device with such liquid, the outlet for the liquid is located at a point substantially below the uppermost part of the interior of the device, and means are provided for ensuring the passage of said air or other gaseous matter away from the liquid outlet to a suitable chamber provided within the device.

Preferably the fluid is passed initially through a metal gauze of substantially fine mesh before passing to the filtering element of felt, fabric, leather or other material, and conveniently this latter filtering element is disposed between two concentrically disposed cylindrical metal gauze filtering elements. The intermediate filtering element may be mounted on a metal cage which is located between the two concentric cylindrical metal gauze filtering elements, and conveniently this cage comprises a plurality of metal rods extending between two metal disc members and spaced along the circumferences of two concentric circles, the felt or other material being corrugated, for instance by being wound re-entrantly around said rods, to provide an increased effective filtering surface of the element. Conveniently the three filtering elements are retained between two metal discs, suitably clamped together, suitable washers of felt or other material being interposed therebetween to provide the necessary fluid-tight joint, and the assembly is preferably retained within a cylindrical container of metal or other suitable material. The ends of the container are closed by end plates with interposed washers of suitable material, which plates are secured to the container by a central tubular member which may also serve to clamp together the two clamping discs. This tubular member is provided with transverse holes and serves as a fluid outlet duct, the upper transverse hole or holes being located substantially below the uppermost portion of the interior of the tubular container. The upper end closing plate of the container serves as the upper side of an air chamber situated above the filtering element, and is provided with an air vent or gas outlet, conveniently in the form of a removable screw plug. The fuel inlet to the filtering device is conveniently mounted on the side of the tubular container, and preferably a baffle is disposed on the interior side of the inlet to direct the fuel substantially downwardly and prevent it from impinging directly on to the surface of the outer metal gauze filtering element. The two metal gauze filtering elements are preferably each supported on perforated tubular members of substantial strength, whereby the clamping discs for securing the filtering elements in position relatively to one another may be secured together with sufficient force to ensure fluid-tightness without causing collapse of the relatively fragile metal gauze elements.

Figure 2:
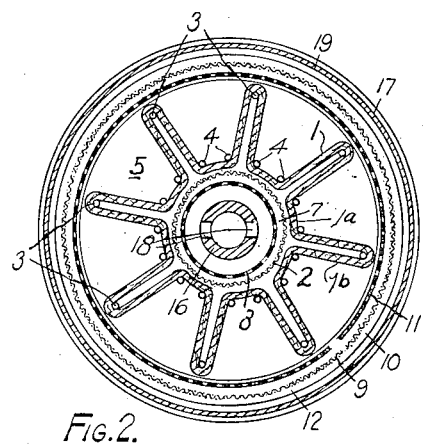

The invention is illustrated by way of example in the accompanying drawing in which Figure 1 is a vertical sectional view of a preferred embodiment of the filtering device according to the invention, for filtering liquid fuel for internal combustion engines, and Fig. 2 is a sectional plan view of the device taken on the line II—II of Fig. 1.

Referring to the drawing, the filtering device comprises essentially a substantially circular filtering element 1 of felt, surrounding a cylindrical metal gauze filtering element 2. The felt filtering element 1 is formed, as shown in the plan view, Fig. 2, of a sheet of felt, which is wound around outer and inner circular rows of vertically arranged rods, 3 and 4 respectively. These rods are secured at their lower ends to a flat disc member 5 and at their upper ends to a downwardly dished disc member 6, and the felt material 1 extends at its ends to the discs 5 and 6 respectively. The filtering element 1 is wound re-entrantly around the rods 3 and 4 to provide an inner series of circularly disposed filtering units 1ª and a series of hollow filtering units 1ᵇ connected to and extending radially from the filtering units 1ª. The metal gauze filtering element 2 is supported by a plurality of metal ring members 7 on a tubular member 8 of perforated metal. A somewhat similar cylindrical metal gauze filtering element 9 is disposed around the exterior of the filtering element 1, and this is also supported by a plurality of metal ring members 10 secured on a cylindrical member 11 of perforated metal. The three filtering elements 1, 2 and 9 are secured between a flanged flat lower clamping disc 12 and a dished upper clamping disc 13, a felt washer 14 being interposed between the bottom lower ends of the filtering elements and the disc 12, and another felt washer 15 being interposed between the upper ends of the filtering elements and the upper disc 13. A central tubular member 16 passing through the centre of the tubular member 8, the felt washer 14 and the disc 12, is screwed at its lower end into a central boss in a lower end cover plate 17 of a container for the filtering elements. At its upper end the tubular member 16 passes through the centre of the upper clamping disc 13, where it is threaded internally to receive a hollow clamping nut 22 and, since a central boss of the lower end cover plate 17 abuts against the lower disc 12, the three filtering elements 1, 2 and 9 may be clamped securely in position between the discs 12 and 13 by tightening the clamping nut 22. The central tubular member 16 is formed with a plurality of transverse holes 18, the uppermost ones of which are located substantially below the upper ends of the filtering elements and the upper disc 13. Around the assembly is disposed a cylindrical casing member 19, the lower end of which bears on a washer 20 and fits within an upturned rim formed at the edge of the lower end cover plate 17. On the upper end of the cylindrical casing member 19 bears an upper end cover plate 21, a suitable washer 28 being inserted between these parts. Through the centre of the upper cover plate 21 passes a pipe union 23 which is threaded to engage the internally threaded portion of the upper end of the hollow clamping nut 22. By tightening the union 23 into the clamping nut 22, the end cover plates 17 and 21 may be clamped together to form with the cylindrical casing member 19, a fluid-tight container for the filtering elements, the outlet from the union 23 communicating with the interior of the casing 19 only through the three filtering elements 2, 1 and 9. A fuel inlet union 24 is secured to the outside of the cylindrical casing member 19 and a cylindrical orifice is made in this casing member to permit the flow into the casing of the fuel to be filtered. Between the orifice and the outer metal gauze filtering element 9 is disposed a baffle plate 25 secured at its upper end to the inner side of the casing 19 and serving to prevent the liquid, as it enters the filter, from impinging directly on to the gauze filtering element 9.

The upper end cover plate 21 is provided with a threaded vent plug 26 and the lower end cover plate 17 is provided with a threaded drain plug 27. The cover plate 21 forms with the recessed upper side of the upper clamping disc 13 a chamber 29 to receive any air or other gaseous matter liberated from the fuel within the filtering elements 1, 2 and 9. This chamber 29 is located above the upper ends of the filtering elements 1, 2 and 9, and the cover plate 21 is spaced from the rim 13ª of the upper clamping disc 13 to provide an annular entrance 29ª to the chamber 29 from the space between the casing member 19 and the filtering element 9.

The operation of the device is as follows:

Fuel entering the filtering device through the fuel inlet 24 is directed downwardly by the baffle plate 25 and then passes through the filtering element 9 by which relatively large impurities are filtered out. The fuel then passes through the intermediate felt filtering element 1 where it is subjected to a very high degree of filtration, and passes from this element to the inner metal gauze filtering element 2. Any minute particles of the felt which may be carried away with the fuel as it leaves the felt filtering element 1 are trapped by the metal gauze filtering element 2 and thus prevented from leaving the filtering device with the fuel passing through the outlet thereof. In the passage of the fuel through the filtering elements 9, 1 and 2, any air or other gaseous matter which may be liberated from the fuel passes upwardly, and, due to the downwardly dished form of the upper disc 6, passes outwardly to the entrance 29ª of the chamber 29 and then passes through said entrance into the chamber 29. The air or other gaseous matter accumulates in the chamber 29 and can be withdrawn periodically by removal of the vent plug 26. The fuel, after passing through the inner filtering element 2, passes by way of the transverse holes 18 into the tubular member 16 and so out through the outlet 23 of the filtering device. By locating the transverse holes 18 in the lower portion of the tubular member 16 at a substantial distance below the disc 13, the air or other gaseous matter is prevented to a substantial extent from passing out through the fuel outlet 23.

It will be evident that the device above described by way of example may be modified considerably within the scope of the invention which provides a fluid filtering device which is particularly suited to the filtering of fuels for internal combustion engines wherein the fuel is delivered to the engine cylinder or cylinders by means of a pump or similar device.

I claim:

In a liquid filtering device, a tubular filtering element an upper downwardly dished end disc and a lower end disc between which said filtering element is located, a tubular container in which said filtering element and end discs are housed, said container having a liquid inlet in the side thereof below said upper end disc, a bottom end closing plate for said container, an upper end closing plate for said container, said upper end closing plate forming with the recessed upper side of said upper end disc an air chamber above said filtering element, said upper end closing plate being spaced from the rim of said upper end disc to form an annular entrance to said air chamber, the lower side of said upper end disc inclining upwardly from the center of said disc to the entrance of said air chamber to direct air liberated from the liquid within said filtering element to the entrance of said air chamber, a venting member for said air chamber carried by said upper end closing plate, and a tubular outlet member for the filtered liquid protruding from said container, said tubular outlet member having its inlet located below said air chamber and within said filtering element.

ARTHUR ALEXANDER SIDNEY.